Oct. 22, 1963   G. A. WAHLMARK   3,107,632
CONTROL FOR HYDRAULIC DEVICE
Filed July 5, 1960   7 Sheets-Sheet 1
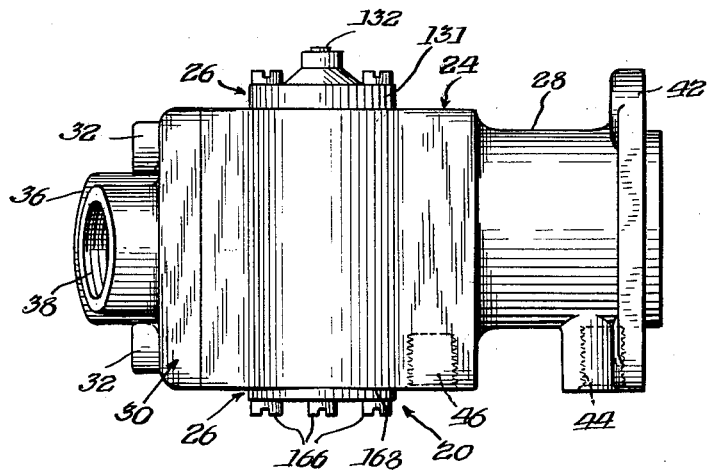
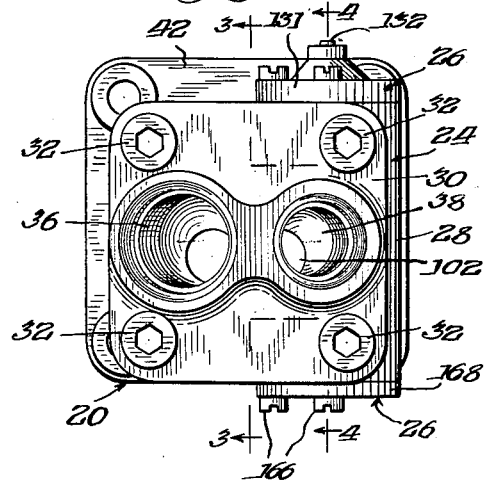
Inventor:
Gunnar A. Wahlmark
By Byron, Hume, Groen, & Clement
Attys.

Oct. 22, 1963  G. A. WAHLMARK  3,107,632
CONTROL FOR HYDRAULIC DEVICE
Filed July 5, 1960  7 Sheets-Sheet 2
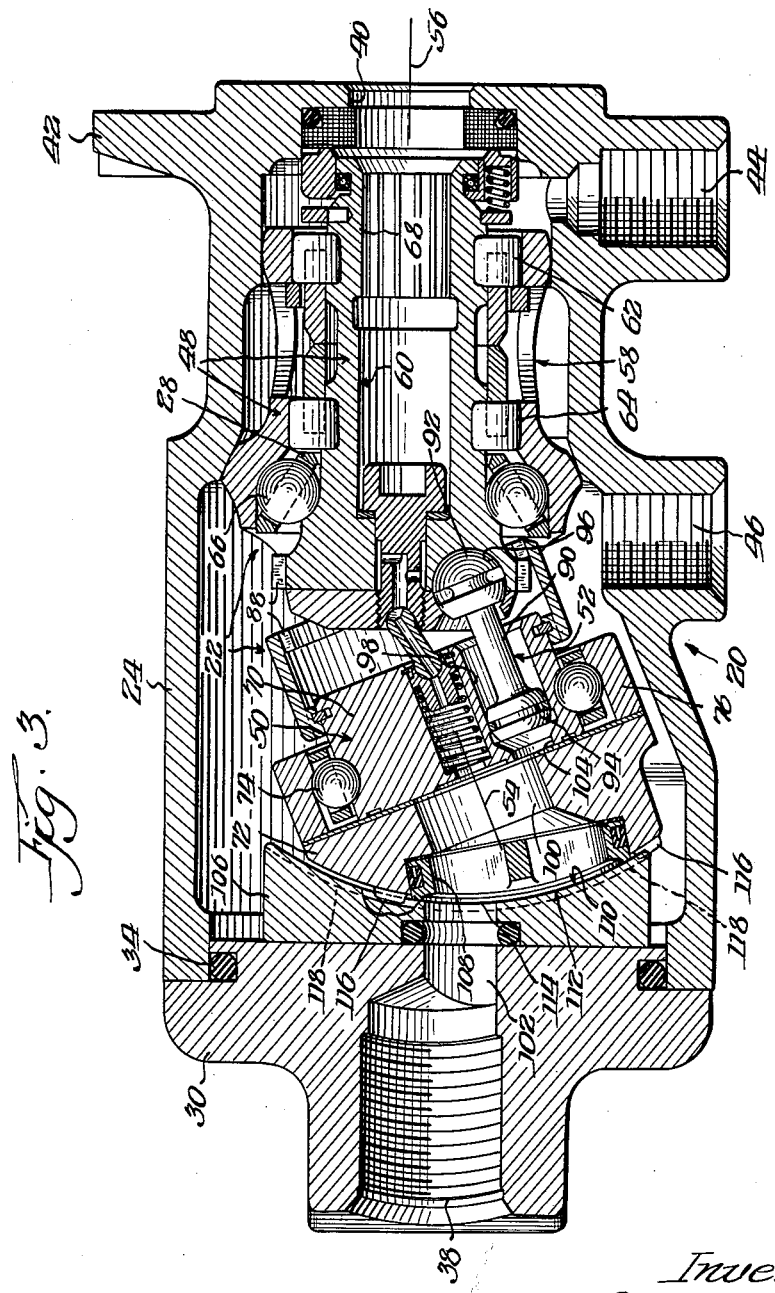
Inventor.
Gunnar A. Wahlmark,
By Byron, Hume, Groen & Clement.
Attys.

Inventor.
Gunnar A. Wahlmark.
By Byron, Hume, Groen, & Clement
Attys.

United States Patent Office 3,107,632
Patented Oct. 22, 1963

3,107,632
CONTROL FOR HYDRAULIC DEVICE
Gunnar A. Wahlmark, 211 S. Rockford Ave., Rockford, Ill.
Filed July 5, 1960, Ser. No. 40,858
4 Claims. (Cl. 103—162)

This invention relates to fluid devices. More particularly, the invention relates to an improved control system for a variable displacement fluid pump or fluid motor. The term "fluid" is used in its broad sense to cover any substance capable of being pumped. However, for simplicity of presentation, the invention will be described primarily in connection with its hydraulic applications.

In the technology of fluid pumps and motors the trend has been toward higher speed, lighter weight units in order to achieve greater performance with units which take up less space and which weigh less. This is particularly true in the aircraft and missile industries. In missiles and space vehicles, for example, small size and low weights are essential, and at the same time increased efficiencies and greater performance are vital. The control system of the present invention achieves considerably improved efficiency and performance while reducing size and weight.

The particular embodiments of the invention which are described herein are applied to high speed hydraulic pumps which are adapted to be driven by high speed power sources such as a gas driven turbine or an electric motor. For example, such a turbine or electric motor, together with a pump embodying the control of the present invention, might constitute the essential portions of an auxiliary power unit (APU) in an airborne or space vehicle in order to supply hydraulic power for operating the various controls and other mechanisms of the vehicle.

Since the demands for hydraulic power vary widely in airborne and space vehicles, depending upon the number and extent of actuation of the various servo mechanisms at any given time, it is desirable to vary the output of the hydraulic supply pump in accordance with the hydraulic power demand. A highly efficient variable displacement pump accomplishing this purpose is disclosed and claimed in my prior co-pending patent application, Serial No. 838,868, filed September 9, 1959, entitled "Variable Displacement Fluid Device." The improved control system of the present invention can be efficiently applied to the variable displacement pump of this prior invention, although it will be understood that the improved control is not limited to this application but can also be applied to other types of variable displacement fluid devices. For example, the invention can be applied to variable displacement gear type or centrifugal type fluid devices.

The improved control system of this invention provides a pump output pressure which varies with respect to the pump displacement according to a predetermined schedule. The control provides a "pressure droop" wherein the output pressure at maximum pump displacement is somewhat less than the output pressure at minimum displacement. This is desirable in order to reduce the power requirements for driving the pump at maximum displacement, thus allowing the use of a smaller electric motor or other drive means of smaller power output. While accomplishing this pressure droop, the system of the present invention also achieves a number of other advantages such as elimination of hunting, increased speed of response and considerably simplified construction.

The control system herein disclosed advantageously utilizes a single control means which determines the outlet pressure schedule independent of all other variables. This insures that once a unit is calibrated it will achieve the desired control characteristics independent of dimensional vairations between production units of the same model and independent of operational variations.

It is an important object of the present invention to provide an improved control system for a variable displacement fluid device.

Another object of the invention is to provide a control system embodying improved pressure droop characteristics.

A further object of the invention is to provide a control system for a variable displacement fluid device which is considerably simplified over comparable control systems.

An additional object is to provide an improved control device which achieves desired control characteristics independent of all variables other than the design control variables.

Another object is to provide a control system for a variable displacement fluid device incorporating a single control means defining the control characteristics independent of all other variables in the fluid device.

Still another object of the invention is to provide an improved control device for a variable displacement fluid device achieving a different control setting for each increment of pump displacement to eliminate control hunting.

A still further object is to provide a control system for a variable displacement fluid device achieving increased speed of control response.

An additional object of the invention is to provide a pressure droop control for a variable displacement fluid device in which the pressure droop characteristics can be varied to suit within wide limits.

An important object is to provide an improved control system utilizing a variable displacement fluid device with drive means of reduced power and size.

Another object of the invention is to provide an improved control system for a swash plate variable displacement fluid device.

Other objects, features and advantages will be apparent from the following detailed description, taken in conjunction with the accompanying drawings, in which:

FIGURE 1 is a longitudinal elevational view of one embodiment of a variable displacement fluid device incorporating a control system according to the present invention.

FIGURE 2 is an elevational view of the port end of the fluid device shown in FIGURE 1.

FIGURE 3 is an enlarged sectional view taken substantially along line 3—3 of FIGURE 2, showing the hydraulic device in the maximum displacement condition.

*Embodiment of FIGURES 1–6*

Figure 4:
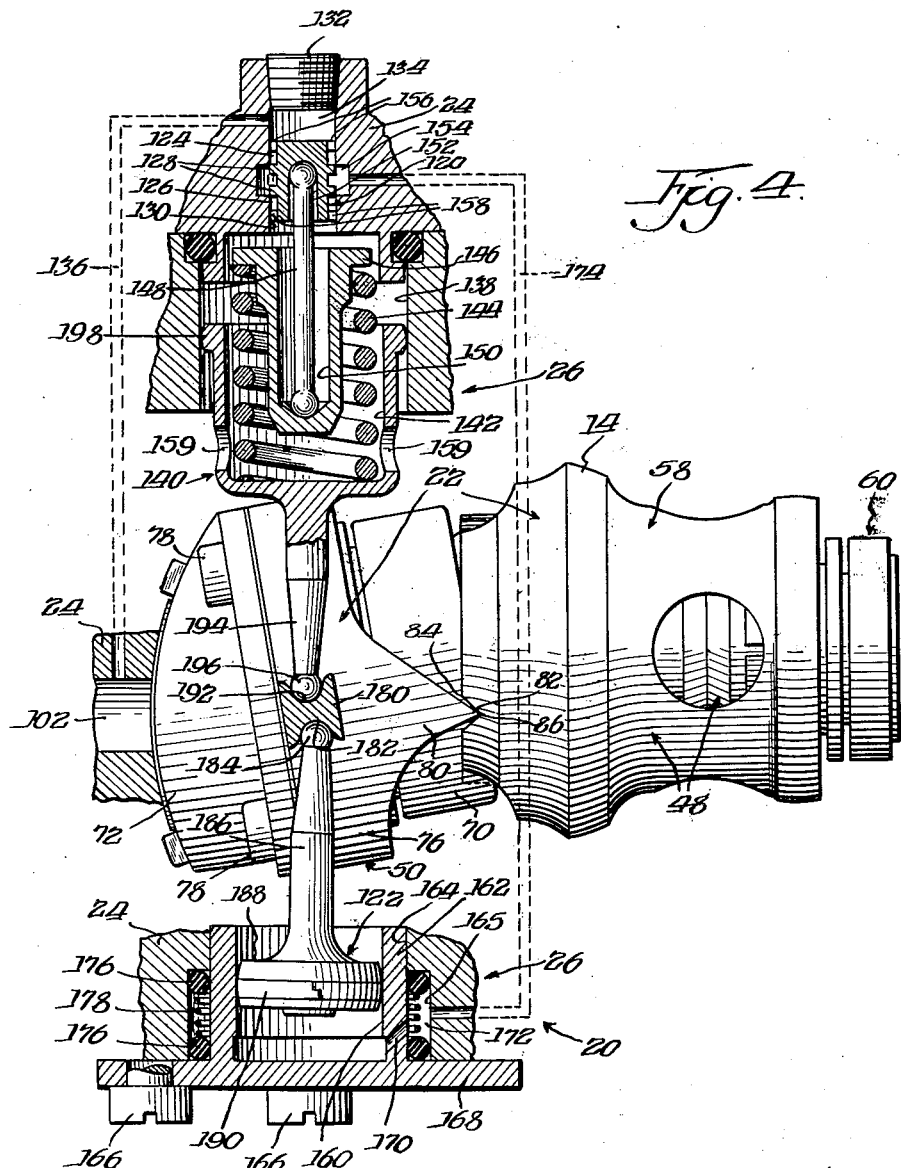
FIGURE 4 is an enlarged sectional view taken along lines 4—4 of FIGURE 2 but showing the fluid device and the control system operating in an intermediate displacement condition, with most of the housing removed for simplification and with the hydraulic connections illustrated schematically.

The control system of the present invention as shown in these figures is embodied in a variable displacement fluid pump (or motor) which is generally designated in the drawings by the reference numeral 20. The fluid device 20 comprises a variable displacement pump mechanism assembly 22 operatively disposed in a casing or housing 24. According to the present invention the displacement of the pump mechanism is automatically controlled by a control system or aparatus generally designated by the reference numeral 26. The specific fluid device shown is a "swash plate" piston type hydraulic device in which the displacement is varied by varying the stroke of the pistons through change in the swash angle between the cylinder barrel and the swash barrel.

The pump housing 24 is of two piece construction and includes a body portion 28 and a port end cap 30. The end cap 30 is fixedly secured at one open end of the body 28 by means of a plurality of attachment screws 32 or the like, and an O-ring seal 34 of suitable relatively soft sealing material is appropriately disposed between the end cap and the body. An internally threaded inlet port 36 and internally threaded outlet port 38 are formed through the end cap in side-by-side fashion extending in a generally axial direction. At the opposite end of the housing, an axial drive shaft opening 40 is formed and is adapted to permit free insertion of a splined drive shaft (not shown) from a pump driving source such as an electric motor or a gas driven turbine (not shown). A suitable attachment flange 42 is integrally formed at the shaft opening end of the housing body. An internally threaded lubrication and cooling flow inlet port 44 and an internally threaded outlet port 46 are formed through the bottom of the housing body in appropriately spaced bosses as shown. The two major portions of the housing 24 are formed of a suitable rigid material such as steel or strong aluminum alloy.

Figure 5:
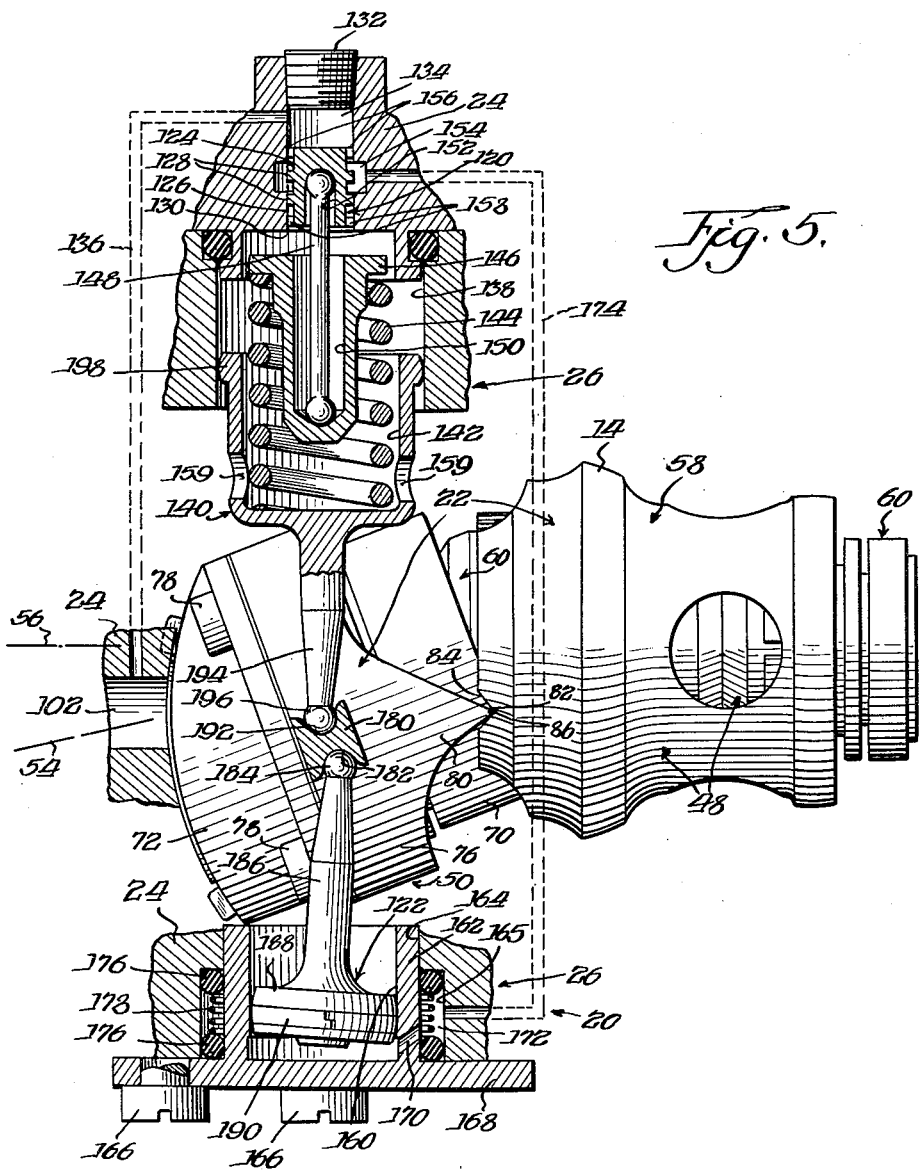
FIGURE 5 is an enlarged sectional view similar to FIGURE 4 but showing the fluid device in the maximum displacement condition and the control system operating to reduce the displacement.
Figure 6:
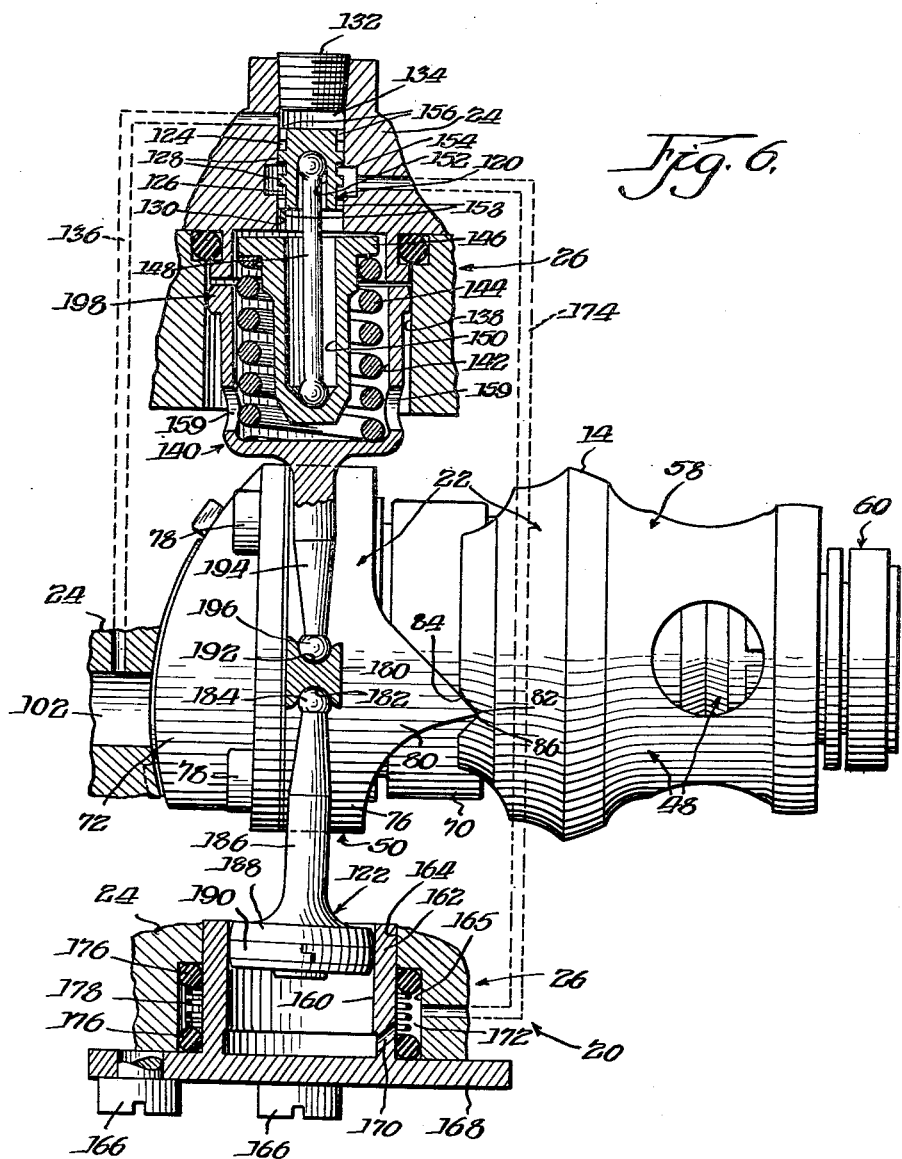
FIGURE 6 is a sectional view similar to FIGURES 4 and 5 but illustrating the fluid device at a very small displacement and showing the control system operating to increase the displacement.

The pump mechanism assembly 22 includes swash mechanism 48 and tiltable cylinder block mechanism 50. These two mechanisms are pivotally associated in a manner described in detail in my prior co-pending application, Serial No. 838,868, referred to above, in order to change the displacement of the device. Alteration of the angle between the swash mechanism 48 and the cylinder block mechanism 50 results in change in the stroke of a plurality of pumping pistons 52 which are operatively disposed between the swash mechanism and the cylinder block mechanism. With hydraulic device in the condition shown in FIGURES 3 and 5, the axis 54 of the cylinder block mechanism is disposed at the maximum "swash" angle with respect to the axis 56 of the swash mechanism 48, and in this condition maximum displacement and maximum stroke of the pistons are achieved. When the mechanisms are pivoted so that the axis 54 of the cylinder block mechanism coincides with the axis 56 of the swash mechanism 48, the stroke of the pistons and the displacement of the device are both zero. It will be understood that an infinite number of different piston strokes and displacements are achieved with the axes at lesser swash angles than the maximum swash angle. For example, FIGURE 4 illustrates the mechanism at an intermediate swash angle and FIGURE 6 illustrates the mechanism at a very small swash angle. The various elements of the swash mechanism 48 and the cylinder block mechanism 50 are formed of suitable rigid materials, preferably metal such as appropriately hardened steel unless otherwise indicated.

The pump mechanism is adapted to be rotated in a clockwise direction when viewed from the port end or in a counterclockwise direction when viewed from the drive end.

The swash mechanism 48 includes an outer stationary bearing shell 58 and an inner rotatable swash barrel 60. The bearing shell 58 is firmly seated within the housing 24 as shown and as specifically described in my prior co-pending application Serial No. 838,868, the swash barrel 60 is rotatably supported within the bearing shell 58 by means of a pair of axially spaced anti-friction roller bearing assemblies 62 and 64 and by means of an anti-friction thrust ball bearing assembly 66. The swash barrel may be driven through an internal spline 68 which is adapted to receive a drive shaft (not shown) which can be inserted through the drive opening 40 in the housing.

The cylinder block mechanism 50 includes a rotatable cylinder barrel 70 connected to a non-rotatable cylinder end cap 72 by means of an anti-friction ball bearing assembly 74. The end cap 72 is fixedly secured to a pivot control ring 76 by means of a plurality of screws 78. The end cap is preferably formed of a hard material which has good frictional bearing characteristics when in contact with the steel cylinder barrel 70. A suitable material is bearing bronze, for example.

The cylinder block mechanism 50 is pivotally associated with the swash mechanism 48 through an off-center knife edge pivot arrangement formed by a pair of integral pivot arms 80 of the pivot control ring 76 which bear against and pivot on the left end of the bearing shell 58. The pivot arms 80 terminate in corresponding knife edge pivots 82 which pivotally seat in corresponding pivot notches or seats 84 formed in the end face of the bearing shell. The lines of engagement of the two pivots 82 with the apexes of the pivot seats 84 define a pivot axis 86 which is perpendicular to the "swash angle plane," defined by the swash axis 56 and the cylinder axis 54 when they are angularly disposed.

In order that the cylinder barrel 70 will rotate at a constant speed with respect to the swash barrel 60 regardless of the swash angle, a constant velocity universal joint 88 of any suitable design drivingly connects these two members. The particular joint illustrated is described in detail in my co-pending application Serial No. 838,868.

The pistons 52 are five in number in the specific embodiment illustrated. Each comprises a piston rod or shank 90 having an integral spherical ball end portion 92 at one end and a piston head portion 94 at the other end. The pistons may be of any suitable construction such as the "shell type" covered in my prior co-pending application Serial No. 838,868, or the "spherical ring type" covered in my Patent No. 2,956,845, issued October 18, 1960, and entitled "Piston." The particular piston embodiment illustrated is of the spherical ring type.

The respective ball ends 92 of the pistons are universally pivotally retained by any suitable means in respective ball sockets 96 formed in circumferentially spaced relation in the left end portion of the swash barrel 60. The piston head portions 94 of the pistons are reciprocally disposed in respective close fitting cylinders 98 which are formed in circumferentially spaced relation in the cylinder barrel 70, corresponding to the positions of the ball sockets 96 formed in the swash barrel. The arrangement is such that as the swash barrel 60 is rotated, the piston heads 94 are reciprocated in the cylinders 98 with the stroke of the pistons varying as the swash angle.

The constant velocity universal joint 88 "times" or synchronizes the speed of rotation of the cylinder barrel 70 so that it corresponds exactly with the speed of rotation of the swash barrel 60 regardless of the swash angle. It will be seen that the universal joint does not take full torque between the swash barrel and the cylinder barrel but merely synchronizes their rotation. The primary torque is transferred from the swash barrel to the cylinder barrel through the thrust of the pistons as they are reciprocated.

The cylinder block mechanism end cap 72 is formed with an inlet "kidney" port and an outlet "kidney" port, so called because of their kidney shape as shown and described in my prior co-pending Serial No. 838,868. This outlet knidney port 100 is connected to the outlet port 38 in the port end cap 30 through an outlet passage 102. The inlet port arrangement, which is not shown, is similar. When the pump mechanism is rotated in a clockwise direction as viewed from the port end, the cylinders 98 receive hydraulic fluid from the inlet port 36 and the inlet kidney port (not shown) through respective cylinder ports 104 and discharge this hydraulic fluid under pressure to the outlet kidney port 100 through the cylinder ports of pistons on compression stroke as the cylinder ports register with the outlet kidney port.

For conducting hydraulic fluid between the housing ports 36 and 38 and the kidney ports, regardless of the swash angle, the pump mechanism includes a port block 106 and a pair of port shoes, with only the outlet port shoe 108 being shown. The port block 106 is fixedly secured to the inner face of the housing end cap 30 by any suitable means, and a pair of apertures are formed through the port block. When the port block is in place as shown in the figures, the apertures form continuations of the inlet and outlet passages. The inner face of the port block 106 is formed with a segmental cylindrical surface 110 which has its axis at the swash pivot axis 86. The outer face of the cylinder block mechanism end cap 72 is provided with a segmental cylindrical surface 112 formed from the same axis, but the radius of this surface is slightly smaller so that a noticeable clearance is provided between the two segmental cylindrical surfaces for ease of fabrication and assembly.

The port shoes are disposed with sliding clearance in respective grooves formed in the cylinder end cap 72 and they are provided with segmental cylindrical end faces, such as the cylindrical end face 114 of the outlet port shoe 108 as shown. These segmental cylindrical end faces are formed from the pivot axis 86 and they abut and are complementary with the segmental cylindrical face 110 of the port block 106. The port shoes are encircled with suitable hydraulic seals and they are spring and pressure biased into sliding sealing engagement with the port block 106, as described in detail in my co-pending application Serial No. 838,868.

For preventing rotation of the cylinder end cap 72 and for guiding the end cap in its movement with respect to the port block 106, a pair of guide keys 116 are fixedly secured to the end cap and ride in close fitting slidable relation in a guide groove 118 formed in the central portion of the face 110 of the port block. This arrangement permits free pivoting of the tiltable cylinder block mechanism 50 but still prevents rotation of the end cap 72 and the pivot control ring 76.

The control apparatus 26 of the FIGURE 1–6 embodiment of the present invention is constructed and arranged to maintain an output of fluid pressure from the pump mechanism which increases with decrease in pump displacement according to a predetermined schedule. The control system automatically provides a pump displacement sufficient to satisfy the output requirements (within the pump capacity) while maintaining the predetermined pressure schedule.

The control apparatus includes generally a pressure sensing piston 120 and a swash angle control piston 122. The sensing piston 120 is of relatively small diameter and is of the spool type, having an upper annular pressure groove 124 and a lower annular relief groove 126, with an annular control land 128 therebetween. The control land 128 may be split as shown with an annular groove formed to facilitate circumferential flow. The piston 120 is slidably disposed in a close fitting cylinder 130 formed in a removable cap portion 131 of the housing 24. The cap 131 is fixedly secured to the housing in any suitable manner. The upper end portion of the bore 130 is closed by a threaded plug 132 with a pressure sensing chamber 134 being formed between the plug and the upper end of the sensing piston 120. The pressure sensing chamber 134 is connected by means of a passage or conduit 136 (schematically illustrated) to the outlet passage.

In the housing below the bore 130 an enlarged bore 138 is formed slidably receiving a swash angle actuator member 140. The actuator member 140 is formed with a spring seat hollow 142 receiving a relatively heavy coil compression spring 144. The spring is bottomed on the blind bottom end of the spring seat hollow 142, and the upper end of the spring engages an annular spring seat member 146. A compression rod 148 extends between the spring seat member 146 and the sensing piston 120. It will be noted that the compression rod 148 is disposed along the common axes of these members and has its ends inserted in respective elongated blind bores 150 and 152 in the spring seat and the piston. The opposite end portions of the compression rod 148 engage at the exact centers of each member at points near the opposite ends of the members. This eliminates any tendency of the two members to tip or to bind, which is particularly important with respect to the piston 120.

A pressure control bore 154 is formed in the housing 24 and is normally blocked by the annular control land 128 of the sensing piston when the sensing piston is in its balanced position as shown in FIGURE 4. Bleed grooves 156 are formed in the upper edge portion of the sensing piston 120 to connect the sensing chamber 134 with the pressure groove 124. Bleed grooves 158 are formed through the bottom edge portion of the piston to connect the exhaust groove 126 with the chamber 138 below the piston. This chamber is exhausted to the interior pump casing through exhaust ports 159 formed in the actuator member 140. Thus, the piston groove 124 and the area above the sensing piston 120 are subjected to working or outlet pressure of the pump while the areas below the land 128, in the groove 126 and below the piston, are subjected to the very low casing pressure.

The control piston 122 is closely fitted within a bore 160 of a cylinder barrel mmber 162. The cylinder barrel member is disposed within a bore 164 formed within the casing, and the member is fixedly secured to the casing by means of a plurality of attachment screws 166 which extend through an integral attachment flange 168 formed at the bottom end of the cylinder member. A plurality of ports 170 are formed through the wall of the cylinder member 162 and connect the bottom of the cylinder 160 below the piston 122 with an enlarged portion 165 of the bore 164, forming an annular pressure chamber 172. A passage or conduit 174 (schematically illustrated) connects the pressure chamber 172 with the control pressure bore 154 communicating with the sensing piston 120. Accordingly, the pressure control bore 154 adjacent the sensing piston 120 is always in communication with the control piston bore 160 below the control piston.

A pair of resilient sealing O-rings 176 are disposed at opposite ends of the annular pressure chamber 172. One O-ring engages the flange 168 of the piston barrel and the other O-ring engages a shoulder formed at the juncture between the two portions of the bore 164. A light compression spring 178 is disposed between the two O-rings to hold them in place so that they will prevent leakage from the pressure chamber.

A control boss 180 is integrally formed on the side edge portion of the pivot control ring 76 substantially in axial alignment between the sensing piston 120 and the control piston 122. The control boss 180 is provided with a lower segmental spherical socket 182 which receives a universal ball end portion 184 of an integral axial stem 186 of the control piston 122.

The head of the control piston 122 may be advantageously formed with a segmental spherical rim 188 containing a spherically rimmed piston ring 190 in an appropriately placed annular groove in accordance with the invention disclosed and claimed in my above mentioned co-pending application Serial No. 583,797, now Patent No. 2,956,845. By reason of this configuration of the piston head, the piston is permitted to tilt while still preventing leakage from the chamber 160 below the piston. It will be understood that a limited amount of tilting of the piston occurs as the cylinder barrel 50 changes angle with respect to the swash barrel 60.

Directly above the socket 182 an upper segmented spherical socket 192 is formed in the control boss 180. The actuator member 140 is formed with an integral axial stem 194 which has a universal ball member 196 at its bottom end seated in the socket 192. It will be noted that the actuator member 140 is spaced from the walls of the bore 138 except for an integral annular rim 198 about its upper edge portion. The rim 198 stabilizes the upper edge portion of the actuator member but still permits limited tilting of the member within the bore 138 in order to accommodate the tilting caused by pivoting of the cylinder barrel member 50 with respect to the swash barrel member 60.

*Operation of FIGURE 1–6 Embodiment*

In general, as the pump mechanism pumps fluid from the inlet port 36 to the outlet port 38, the control mechanism 26 of the present invention maintains the outlet pressure in accordance with a predetermined schedule which provides decreasing outlet pressure with increasing pump displacement. At the same time the control mechanism varies the pump displacement to satisfy the requirements of the servo mechanisms being actuated (not shown). The pump control maintains the outlet pressure schedule at any rotational speed throughout the pump displacement range as long as the speed is sufficient to produce the output volume required.

The pump is driven through any suitable high speed drive source (not shown) such as an electric motor, gas turbine, or the like. The drive is through a splined drive shaft (not shown) which is inserted through the drive shaft opening 40 of the housing 24 and which drivingly engages the splines 68 of the swash barrel 60. As the swash barrel is rotated, the cylinder barrel 70 is rotated in exactly timed relation and the pistons 52 are reciprocated in the cylinders 98 with strokes depending upon the swash angle.

When the pump mechanism is rotated in a counterclockwise direction looking at the drive end, hydraulic fluid is drawn in the inlet port 36 into cylinders 98 in which the pistons are on their suction strokes. Pistons which are on their compression strokes deliver hydraulic fluid under pressure out the kidney outlet port 100 and the outlet port 38 where it is directed by any suitable conduit means (not shown) to various hydraulic servo mechanisms to be actuated (not shown).

The pivot axis 86 of the cylinder block mechanism 50 is positioned as described in detail in my co-pending patent application Serial No. 838,868 to insure that the pressure force within the cylinders 98 urges the cylinder block mechanism toward the maximum displacement position. The pivot axis is so positioned that the force tending to pivot the cylinder block mechanism always tends to move it toward maximum displacement, but this force is not excessive.

The control spring 144 acts through the actuator member 140 tending to pivot the cylinder block mechanism toward maximum displacement. Thus, the mechanism is always in this position at start to insure maximum pumping capacity and to reduce danger of cavitation.

The port shoes 108 are exactly centered with respect to the knife edge 82 and, of course, to the pivot axis 86, so that they do not exert any unbalanced force tending to pivot the cylinder block mechanism in either direction.

As the pump mechanism begins to rotate at start (at maximum displacement, as explained), a pressure is immediately built up in the outlet port 38. As soon as the outlet pressure reaches that of the outlet pressure schedule for maximum displacement, the sensing piston 120 is depressed in opposition to the force of the control spring 144, allowing a portion of the pressure from the outlet port to communicate, through the various passages, with the control cylinder 160 below the control piston 122. The size of the control piston is such that it will move upwardly against the force exerted by the resultant of the piston pressure forces and the compression of the control spring 144 to pivot the cylinder block mechanism 50 toward a reduced displacement position. This condition is illustrated in FIGURE 5 where the movement of the sensing piston 120 is exaggerated in order to better illustrate the operation. Actually the sensing piston need move only a few thousandths of an inch to provide sufficient pressure to move the control piston.

The arrangement is such that the control piston pressure required is less than half the outlet pressure, for example. In a typical arrangement, 1200 p.s.i. control piston pressure maintains equilibrium at an outlet pressure of 3000 p.s.i. The relatively small control piston pressure required provides a distinct advantage. This pressure can vary substantially between various production models of one design because of variations in friction forces and the like caused by dimensional variations within permissable production tolerances. Such variations have no effect on the outlet pressure schedule, however, after the controls of the units are calibrated to the desired schedule. In other words, all units of one model might maintain a 3000 p.s.i. outlet pressure at a given displacement although control piston pressures to maintain equilibrium at this condition might vary from 800 p.s.i. to 1800 p.s.i. from unit to unit.

As the cylinder block mechanism 50 pivots toward a reduced displacement position, the force exerted by the control spring 144 against the sensing piston 120 is increased causing the sensing piston to move upwardly so that the control boss 128 blocks communication between the sensing pressure chamber 134 and the control pressure bore 154. This happens when the cylinder block mechanism 50 is so positioned that the displacement of the pump is just sufficient to supply the requirements of the servo mechanisms being actuated while maintaining an outlet pressure in accordance with the predetermined pressure schedule.

Figure 9:
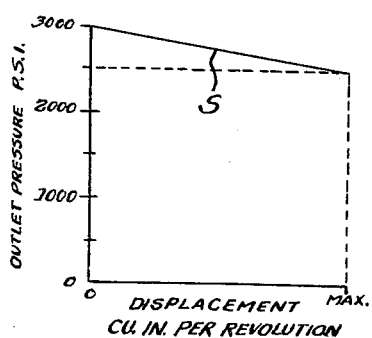
FIGURE 9 is a graphic illustration of pump outlet pressure plotted versus pump displacement for both embodiments of the fluid devices, showing a typical pressure droop schedule.

A typical pressure schedule is illustrated in FIGURE 9, showing the characteristics of a pump and control which provide 3000 p.s.i. outlet pressure at close to zero pump displacement while providing only 2500 p.s.i. outlet pressure at maximum pump displacement. Between these two extremes the control provides intermediate pressures following the pressure schedule S. It will be understood that the schedule S may have any desired profile. Changes in the profile are effected by changing the spring rate or size of the control spring 144.

It is important to note that the characteristics of the control spring 144 are the exclusive determining factor for the output pressure schedule. In other words, variations in construction of other pump and control parts do not effect the control schedule since the control can be calibrated to compensate, and once calibrated the spring characteristics are the sole determining factor for the outlet pressure schedule. This means that once the control is calibrated, the control characteristics are independent of all variables other than the design control variables, the pump displacement in the specific example.

If the requirements of the servo mechanisms being actuated increases, the control system operates as illustrated in FIGURE 6. Assuming that a substantially constant speed is being maintained, the increase in output requirements will be manifested in a decrease in outlet pressure. The sensing piston 120 senses the decreased outlet pressure and is moved upwardly under the bias of the control spring 144, closing communication between the sensing chamber 134 and the control bore 154 and at the same time allowing the control bore to communicate with casing pressure. This immediately reduces the pressure in the control chamber 160 below the control piston 122 which permits the control spring 144 to urge the piston block mechanism 50 toward an increased displacement position. The increased displacement causes a simultaneous increase in outlet pressure which again achieves a balance between pump displacement and pump outlet pressure in accordance with the schedule S shown in FIGURE 9. When the schedule is again reached, the sensing piston 120 is moved to its equilibrium position as shown in FIGURE 4, where the control land 128 blocks passage of fluid to or from the control bore 154. This all happens usually within a fraction of a second.

It will be understood that the "pressure droop" of the pressure schedule illustrated in FIGURE 9 is achieved by reason of extension of the control spring 144 as the piston block mechanism 50 pivots toward maximum displacement. Inasmuch as movement of the sensing piston 120 is only a few thousandths of an inch up or down, the spring seat member 146 remains in an almost constant position. As the control spring 144 is extended, it exerts less force against the sensing piston 120, so that the outlet pressure force required in the sensing pressure chamber 134 to overcome the spring-biased movement becomes increasingly less as the pump displacement increases. Conversely, as the pump displacement decreases, the control spring 144 is shortened so that it exerts a greater force which must be opposed by a greater outlet pressure communicated to the sensing chamber 134.

By reason of the pressure droop control system according to this invention, control hunting is eliminated. A pressure droop schedule, as illustrated in FIGURE 9, provides a different control pressure for each different pump displacement, corresponding to different angular relationships between the swash barrel 60 and the piston barrel mechanism 50. At any given setting the pressure required to reduce the displacement is always different from the pressure required to increase the displacement, so that once a position of equilibrium has been attained, it is maintained without hunting. Accordingly, no balance or dampener springs are required. Furthermore, inasmuch as the control spring 144 acts in a dual capacity, biasing the sensing piston 120 as well as urging the swash barrel 50 toward mixim displacement, the speed of control response is substantially increased.

The pressure droop schedule can follow any desired profile depending only upon the spring rate and characteristics of the control spring 144. The slope of the curve may be much greater or it may be substantially zero, depending upon the control response required in any particular application. It is possible even to eliminate the pressure droop by utilizing a control spring or spring combination which exerts a constant pressure within the range of extension required.

Figure 7:
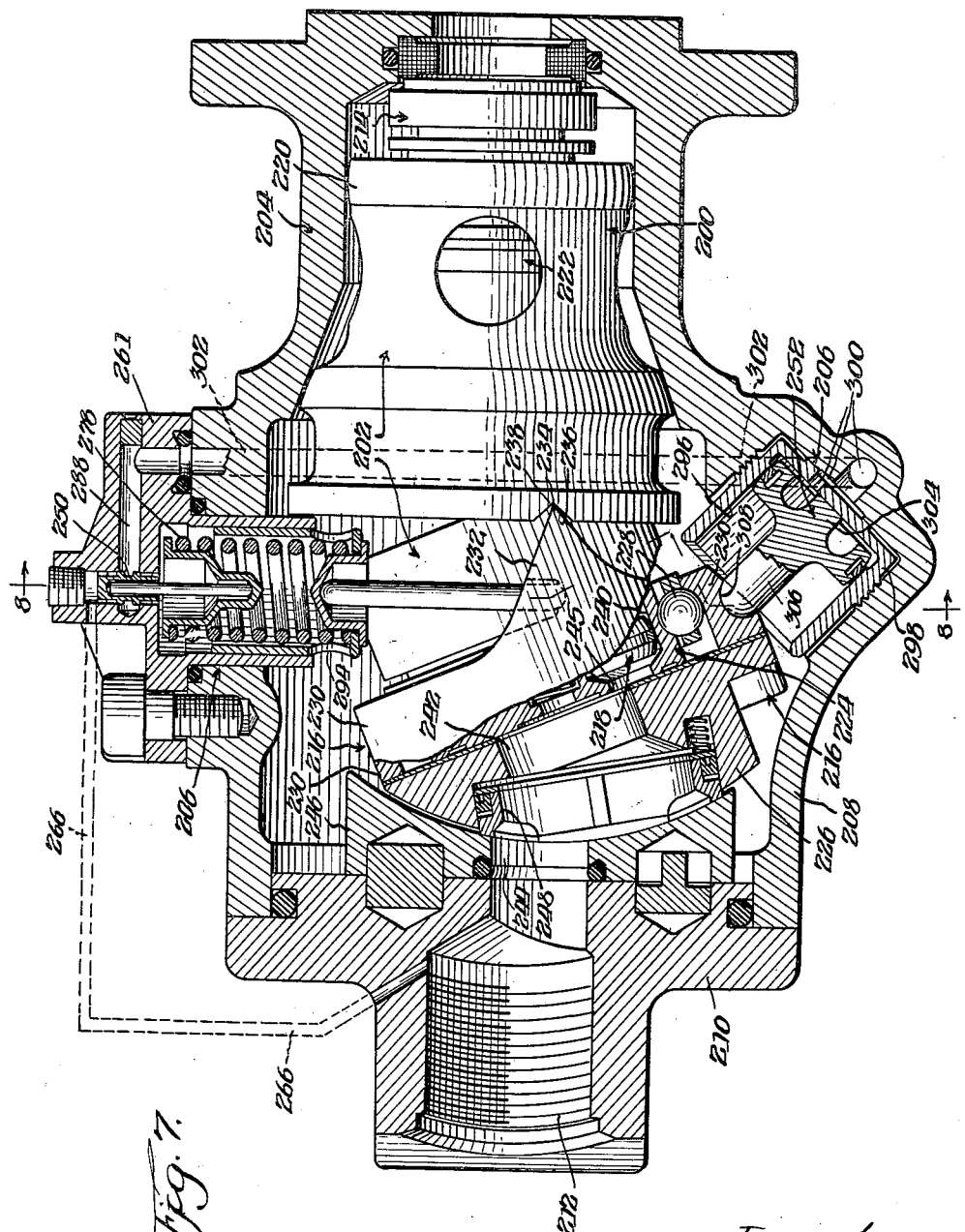
FIGURE 7 is an enlarged longitudinal sectional view, partly broken away and partly in elevation, illustrating a second embodiment of the invention applied to a variable displacement fluid device similar to that of the first embodiment, shown in the maximum displacement condition.
Figure 8:
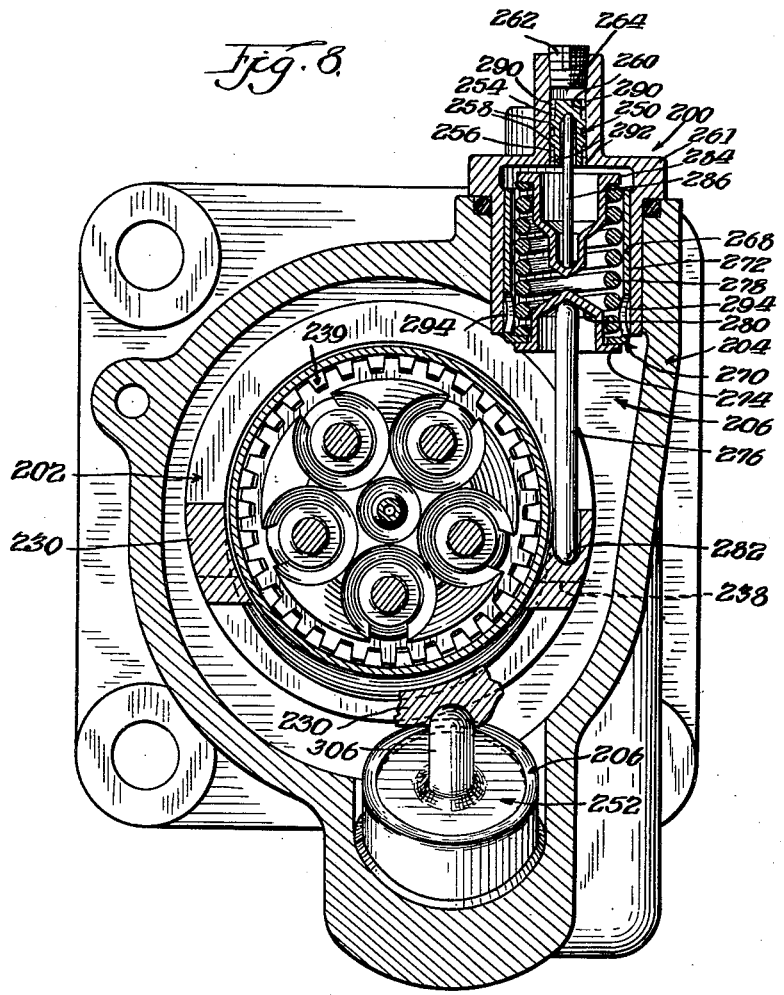
FIGURE 8 is a sectional view taken substantially along line 8—8 of FIGURE 7 but illustrating the fluid device and the control system in the zero displacement position.

*Embodiment of FIGURES 7 and 8*

This embodiment of the invention is shown applied to a variable displacement fluid device 200 which is quite similar to the fluid device 20 of the first embodiment. The fluid device 200 comprises a variable displacement pump mechanism assembly 202 operatively disposed in a casing or housing 204. The displacement of the pump mechanism is automatically controlled by a control system or apparatus 206 according to the invention.

The pump housing 204 is of two piece construction and includes a body portion 208 and a port end cap 210 with these parts being fixedly secured in sealed relation in any suitable manner. An internally threaded inlet port (not shown) and an internally threaded outlet port 212 are formed through the end cap in side by side fashion in a similar manner to the inlet and outlet ports of the first embodiment. The pump mechanism 202 is adapted to be driven in a manner similar to that of the first embodiment.

The pump mechanism assembly 202 includes swash mechanism 214 and tiltable cylinder block mechanism 216. These two mechanisms are pivotally associated as in the first embodiment for changing the displacement of the fluid device. The pump mechanism is adapted to be rotated in a clockwise direction when viewed from the port end.

The swash mechanism 214 includes an outer stationary bearing shell 220 and an inner rotatable swash barrel 222. Bearing shell 20 is firmly seated within the housing 204 and the swash barrel 222 is rotatably supported within the bearing shell by means of anti-friction bearings (not shown) in a manner similar to the first embodiment.

The cylinder block mechanism 216 includes a rotatable cylinder barrel 224 connected to a non-rotatable cylinder end cap 226 by means of an anti-friction ball bearing assembly 228. The end cap is fixedly secured to a pivot control ring 230 as in the first embodiment.

The cylinder block mechanism 216 is pivotally associated with the swash mechanism 214 through an off-center knife edge pivot arrangement formed by a pair of integral pivot arms 232 of the pivot control ring 230 which bear against and pivot on the left end of the bearing shell 220. The pivot arms 232 terminate in corresponding knife edge pivots 234 which pivotally set in corresponding pivot notches or seats 236 formed in the end face of the bearing shell. The lines of engagement of the two pivots 234 with the apexes of the pivot seats 236 define a pivot axis 238 which is perpendicular to the plane defined by the axes of the swash mechanism and cylinder block mechanism when they are angularly disposed.

In order that the cylinder barrel 224 will rotate at a constant speed with respect to the swash barrel 222 regardless of the swash angle, a constant velocity universal joint of any suitable design 239 drivingly connects these two members.

The pistons 218 are five in number in the specific embodiment illustrated. Each piston may be similar to the pumping pistons of the previous embodiment. The piston head portions of the piston are reciprocally disposed in respective close fitting cylinders 240 which are formed in circumferentially spaced relation in the cylinder barrel 224.

The cylinder block mechanism end cap 226 is formed with inlet and outlet "kidney" ports with only the outlet kidney port 242 being shown. This outlet kidney port is connected to the outlet port 212 in the port end cap 210 through an outlet passage 244. The inlet port arrangement, which is not shown, is similar. The cylinders 240 communicate with the inlet and outlet kidney ports alternately through respective cylinder ports 245.

For conducting hydraulic fluid between the housing inlet and outlet ports and the cylinder ports 245 regardless of the swash angle, the pump mechanism includes a port block 246 and a pair of port shoes, with only the outlet port shoe 248 being shown. The port block 246 is fixedly secured to the inner face of the housing end cap 210 in any suitable manner with suitable apertures being formed therethrough to provide continuations of the inlet and outlet passage. The port block 246, the cylinder end cap 226 and the port shoes are constructed, arranged and guided to allow pivoting of the cylinder block mechanism 216 about the pivot axis 238 in a manner similar to that of the first embodiment.

The control apparatus 206 of the embodiment of FIGURES 7 and 8 includes generally a pressure sensing piston sensing piston 250 and a swash angle control piston 252. The sensing piston 250 is constructed and arranged in essentially the same manner as the sensing piston of the first embodiment. It includes an upper annular pressure groove 254 and a lower annular relief groove 256 with an annular control land 258 therebetween. The piston 250 is slidably disposed in a close fitting cylinder 260 formed in a fixedly secured cap portion 261 of the housing 204. The upper end of the bore 260 is closed by the threaded plug 262, and a pressure sensing chamber 264 is formed between the plug and the upper end of the sensing piston. The pressure sensing chamber 264 is connected by means of a passage 266 (schematically illustrated) to the outlet passage 244.

In the cap portion 261 below the bore 260 on enlarged bore 268 is formed slidably receiving a swash angle actuator member 270. In this embodiment, the actuator member 270 is formed in three parts, a sleeve portion 272, a seat member 274 and a compression rod 276. A relatively heavy coil compression control spring 278 is disposed within the sleeve portion 272 and bears down through an internally flanged bottom of the sleeve against the peripheral edges of the seat member 274. The actuator rod 276 engages in a central hollow 280 of the seat member and has its other end engaging in a seat socket 282 formed in one of the pivot arms 232 of the pivot control ring 230. The upper end of the spring 278 bears against the peripheral edge of a spring seat member 284, and compression rod 286 extends between the spring seat 284 and the sensing piston 250. The compression rods 276 and 286 are axially aligned and are disposed along a common axis of the sensing piston and the actuator assembly 270. The opposite end portions of the compression rods engage their mating members at the exact centers in axially outwardly spaced positions to eliminate any tendency of the members to tip or bind.

A control bore 288 is formed in the housing 204 and is normally blocked by the annular control land 258 of the sensing piston when the sensing piston is in its balanced position as shown in FIGURES 7 and 8. Bleed grooves 290 are formed at the upper edge portion of the sensing piston 250 to bleed outlet pressure into the pressure groove 254, and bleed grooves 292 are formed through the bottom edge portion of the piston to connect the exhaust groove 256 with the chamber 268 below the piston. This chamber is exhausted to the interior pump casing through exhaust ports 294 formed at the bottom of the sleeve 272. Thus, the piston groove 254 and the area above the sensing piston are subjected to working or outlet pressure of the pump while the piston groove 256 and the area below the piston are subjected to the low casing pressure.

The control piston 252 is closely fitted within a bore 296 formed in a cylinder barrel member 298. The cylinder member 298 is threadedly secured within a bore formed within the casing 204. A passage arrangement 300 is formed communicating with the cylinder barrel 296 below the piston 252. A passage 302 (schematically illustrated) connects the passage 300 with the control pressure bore 288 communicating with the sensing piston.

According to the present embodiment of the invention, the control piston 252 is not aligned with the sensing piston 250 but instead is disposed in a plane containing the average resultant of the piston pressure forces tending to pivot the cylinder block mechanism 216 toward maximum displacement. The axis of the control piston 252 is thus moved inwardly closer to the plane defined by the axes of the swash mechanism 214 and cylinder barrel mechanism 216 to a position substantially as shown in FIGURE 8. The axis of the cylinder barrel 298 is tilted toward the port end of the fluid device in order to balance the force exerted against the pivot control ring 230 so that there will be no substantial tendency to move the pivot control ring either toward or away from the pivot notches 236.

The control piston 252 may be of the spherical piston ring design as shown and includes a central integral stop stud 304 and an integral axial stem 306. The upper end of the stem 306 is spherically formed and fits in a spherical socket 308 formed in the pivot control ring 230. By reason of this configuration and arrangement of the control piston, the piston is permitted to tilt while still preventing leakage from the control pressure chamber below the piston.

It is ordinarily not necessary to locate the axis of the spring 278 and the sensing piston 250 in the plane of the average resultant forces inasmuch as the force exerted by the spring is considerably less than that exerted by the control piston. This is apparent because the spring acts in conjunction with the pressure forces tending to move the cylinder barrel mechanism 216 toward maximum displacement position, but the force exerted by the control piston 252 must act in opposition to the resultant pressure forces as well as the force of the spring 278. However, it is within the scope of this invention to move the axis of the sensing piston and the control spring into the same plane as the axis of the control piston 252 to eliminate all tendency toward cocking. By reason of the arrangement of FIGURES 7 and 8, however, the overall envelope size of the mechanism is substantially reduced and the unit is more compact.

*Operation of FIGURES 7 and 8 Embodiment*

The control apparatus 206 of this embodiment operates in generally the same manner as the control system of the first embodiment with the exception that the force of the control piston 252 is exerted in the plane of the average resultant of the piston pressure forces in order to eliminate any tendency for cocking of the cylinder barrel mechanism 216 relative to the swash mechanism 214.

As the pump mechanism begins to rotate at start (at maximum displacement as explained in connection with the first embodiment), a pressure is immediately built up in the outlet port 212. As soon as the pressure reaches the control pressure according to the outlet pressure schedule for maximum displacement, the sensing piston 250 is depressed in opposition to the force of the control spring 278 allowing pressure from the outlet port to communicate through the various passages with the control cylinder 296 below the control piston 252. The size of the control piston is such that a pressure less than half of the pump outlet pressure will cause it to move in opposition to the compression of the control spring 278 and the resultant of the pressure forces on the pumping pistons 218 to pivot the cylinder block mechanism 216 toward a reduced displacement position.

As the cylinder block mechanism 216 pivots toward a reduced displacement position, the force exerted by the control spring 278 against the sensing piston 250 increases causing the build up of a higher outlet pressure. Conversely, as the cylinder block mechanism moves toward increased displacement, the control spring 278 is extended and exerts less force resulting in a decreased outlet pressure required to maintain equilibrium. Accordingly, the control system of this embodiment provides the same pressure droop characteristics as the first embodiment, and the pressure droop schedule can be altered in the same way.

From the foregoing description, it will be understood that the present invention provides an improved control system for variable displacement hydraulic devices permitting great flexibility in the outlet pressure schedule with respect to displacement of the devices. Ordinarily, the control is utilized to provide pressure droop characteristics whereby the outlet pressure at maximum displacement is somewhat less than the outlet pressure at zero displacement so that a hydraulic pump, for example, may be driven by a motor or the like of smaller power and smaller size. In addition to extreme control flexibility, the present invention provides a very much simplified control in which control overshooting and pressure surges are eliminated. Furthermore, the outlet pressure schedule is determined exclusively by the characteristics of the control spring. The control arrangement is such that production tolerance variations in production models have no effect on the control pressure schedule once the units are calibrated.

Variations and modifications may be affected without departing from the scope of the novel concepts of the present invention.

I claim:

1. In a fluid device including a rotatable swash member universally drivingly connected with a rotatable cylinder member and having a plurality of pistons operatively disposed between the members for reciprocation in the cylinder member, a casing containing said members, mechanism pivotally supporting said members with respect to one another for changing the strokes of said piston, inlet and outlet port means communicating with said cylinder member, a sensing piston, means communicating pressure from said outlet port means against one end of said sensing piston urging said sensing piston in one direction, spring means in said casing for urging said sensing piston in the opposite direction, means communicating casing pressure to the other end of said sensing piston, a control piston operatively associated with one of said members for pivoting said member in the direction of decreasing piston strokes, said spring means also acting in opposition to said control piston and biasing said one member in the direction of increasing piston strokes, a control chamber communicating with one end of said control piston, a control port communicating with said control chamber, and said sensing piston having a control portion controlling said control port to meter outlet pressure to said control chamber in accordance with a predetermined outlet pressure schedule and to meter casing pressure to said control chamber at outlet pressures below those in said pressure schedule, whereby said control piston and said spring means vary the position of said one member to maintain the outlet pressure in accordance with said pressure schedule.

2. In a fluid device including a rotatable swash member universally drivingly connected with a rotatable cylinder member and having a plurality of pistons operatively disposed between the members for reciprocation in the cylinder member, mechanism associated with said members for changing the strokes of the said pistons up to a predetermined maximum stroke, comprising a swash support element rotatably carrying said swash member, a cylinder support element rotatably carrying said cylinder member, means supporting one of said elements with respect to the other of said elements for pivoting about a pivot axis, said pivot axis being located so that the resultant of the pressure forces on said pistons always urges said one element in the direction of maximum piston strokes, inlet and outlet port means communicating with said cylinder member, a sensing piston, means imposing pressure from said outlet port biasing said sensing piston in one direction, spring means acting between said sensing piston and said one element biasing said sensing piston against the pressure bias and biasing said one member in the direction of increasing piston strokes, a control piston operatively associated with said one member, and means directing a control pressure to said control piston from said sensing piston when said sensing piston has been moved a predetermined distance by outlet pressure against the bias of said spring means for pivoting said one member in the direction of decreasing piston strokes, whereby the outlet pressure decreases in accordance with a predetermined schedule with increase in piston strokes, and whereby said schedule of outlet pressure may be varied by changing the characteristics of said spring means.

3. In a fluid device including a rotatable swash member universally drivingly connected with a rotatable cylinder member and having a plurality of pistons operatively disposed between the members for reciprocation in the cylinder member, mechanism pivotally supporting said members with respect to one another for changing the strokes of said pistons, inlet and outlet port means communicating with said cylinder member, a pressure actuatable servo operatively associated with one of said members, pressure sensing means for sensing pressure from one of said ports and directing a reduced control pressure to said servo for pivoting said one member in the direction of decreasing piston strokes, the pressure actuated force of said servo being directed in a plane containing the average of the resultant pressure forces of said pistons to substantially eliminate servo induced twisting forces between said members, and spring means associated with said one member and acting in opposition to pressure actuated movement of said servo pivoting said one member in the direction of increasing piston strokes.

4. In a fluid device including a rotatable swash member universally drivingly connected with a rotatable cylinder member and having a plurality of pistons operatively disposed between the members for reciprocation in the cylinder member, mechanism pivotally supporting said members with respect to one another for changing the strokes of said pistons, inlet and outlet port means communicating with said cylinder member, a sensing piston, a control piston operatively associated with one of said members, means imposing pressure from said outlet port urging said sensing piston in one direction, spring means associated with said one member for urging said sensing piston in the opposite direction, means directing pressure to said control piston from said sensing piston when moved a predetermined distance by outlet pressure for pivoting said one member in the direction of decreasing piston strokes, the axis of said control piston being disposed in a plane containing the average of the resultant pressure forces of said plurality of pistons to substantially eliminate control piston induced twisting forces between said members, and spring means associated with said one member and acting in opposition to pressure actuated movement of said control piston pivoting said one member in the direction of increasing piston strokes.

References Cited in the file of this patent

UNITED STATES PATENTS

| 2,731,569 | Cardillo et al. | Jan. 17, 1956 |
| 2,954,806 | Funston | July 17, 1956 |
| 2,882,863 | Newton | Apr. 21, 1959 |
| 2,969,021 | Menon | Jan. 24, 1961 |

FOREIGN PATENTS

| 751,231 | Great Britain | June 27, 1956 |